United States Patent
Poole et al.

(10) Patent No.: US 12,020,022 B2
(45) Date of Patent: Jun. 25, 2024

(54) IN-BAND INSTANTIATION CONFIGURATION FOR APPLICATION WORKLOADS

(71) Applicant: INTERNATIONAL BUSINESS MACHINES CORPORATION, Armonk, NY (US)

(72) Inventors: Christopher John Poole, Romsey (GB); Mark Andrew Woolley, Winchester (GB); Thomas James Waterton, Southampton (GB); Joseph Peter Kent, Stockbridge (GB)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/654,256

(22) Filed: Mar. 10, 2022

(65) Prior Publication Data
US 2023/0289177 A1  Sep. 14, 2023

(51) Int. Cl.
*G06F 8/71* (2018.01)
*G06F 8/10* (2018.01)
*G06F 8/60* (2018.01)

(52) U.S. Cl.
CPC ............ *G06F 8/71* (2013.01); *G06F 8/10* (2013.01); *G06F 8/60* (2013.01)

(58) Field of Classification Search
CPC .............. G06F 8/10; G06F 8/60; G06F 8/71
See application file for complete search history.

(56) References Cited

U.S. PATENT DOCUMENTS

| | | | |
|---|---|---|---|
| 7,493,380 B2* | 2/2009 | Aman | H04L 67/1008 709/219 |
| 9,379,903 B1* | 6/2016 | McAlister | G06F 11/3433 |
| 9,769,085 B2* | 9/2017 | Laribi | G06F 11/3006 |
| 10,318,320 B1* | 6/2019 | Thomas | G06F 9/45558 |
| 10,574,741 B2* | 2/2020 | Jastrzebski | H04L 41/0816 |
| 10,896,060 B1* | 1/2021 | Sciarrino | G06F 9/48 |
| 11,132,226 B2* | 9/2021 | Jadhav | G06F 9/5077 |
| 2006/0195547 A1* | 8/2006 | Sundarrajan | H04L 69/32 709/217 |

(Continued)

OTHER PUBLICATIONS

International Search Report and Written Opinion, International Application No. PCT/EP2023/054313, International Filing Date: Feb. 21, 2023, Date of Mailing: May 3, 2023, 16 pages.

(Continued)

*Primary Examiner* — Douglas M Slachta
(74) *Attorney, Agent, or Firm* — Jordan T. Schiller (57) ABSTRACT

A computer-implemented method, computer program product, and system for managing an application. The computer-implemented method comprises defining, by a first application, a specification of a second application and sending, by the first application, a request to a subsystem, wherein the request comprises a file, the file comprising the specification, and request data to be processed. The computer-implemented method further comprises configuring, by the subsystem, an instance of the second application, wherein the configuring comprises provisioning the instance according to the specification and sending the received request data to the instance. The computer-implemented method further comprises processing, by the instance, the request data.

24 Claims, 7 Drawing Sheets

(56) References Cited

U.S. PATENT DOCUMENTS

| | | | |
|---|---|---|---|
| 2009/0276527 A1* | 11/2009 | McClain | G06F 9/5011 709/226 |
| 2010/0274910 A1* | 10/2010 | Ghanaie-Sichanie | H04L 63/08 709/229 |
| 2010/0333092 A1* | 12/2010 | Stefansson | H04L 67/10 718/100 |
| 2012/0324066 A1* | 12/2012 | Alam | G06F 9/54 709/222 |
| 2018/0270301 A1* | 9/2018 | Zhang | H04L 67/1001 |
| 2020/0183744 A1* | 6/2020 | Kim | H04L 67/1008 |
| 2020/0364098 A1 | 11/2020 | Yan | |
| 2020/0389516 A1* | 12/2020 | Parekh | G06F 9/5077 |
| 2020/0412707 A1* | 12/2020 | Siefker | H04L 63/101 |
| 2021/0019277 A1 | 1/2021 | Jha | |
| 2021/0073059 A1* | 3/2021 | Swildens | G06Q 10/107 |
| 2021/0263779 A1 | 8/2021 | Haghighat | |
| 2022/0027197 A1* | 1/2022 | Tang | G06F 9/5072 |
| 2022/0237024 A1* | 7/2022 | Chen | G06F 9/50 |

OTHER PUBLICATIONS

Kaviani et al., "Towards Serverless as Commodity: a case of Knative", WOSC '19, Dec. 9-13, 2019, pp. 13-18.

AWS App Runner, "AWS App Runner," Amazon.com [datasheet], [accessed on Mar. 8, 2022], 3 pages, Retrieved from the Internet: <URL: https://aws.amazon.com/apprunner/>.

AWS Fargate, "Serverless compute for containers," Amazon.com [datasheet], [accessed on Mar. 8, 2022], 1 page, Retrieved from the Internet: <https://aws.amazon.com/fargate/>.

AWS Lambda, "Run code without thinking about servers or clusters," Amazon.com [datasheet], [accessed on Mar. 8, 2022], 4 pages, Retrieved from the Internet: <https://aws.amazon.com/lambda/>.

Mell, et al., "The NIST Definition of Cloud Computing", National Institute of Standards and Technology, Special Publication 800-145, Sep. 2011, 7 pages.

* cited by examiner

| Step | Name: APP_N1 |
|---|---|
| 612 | Receive dataset |
| 614 | Extract names, teams and scores |
| 616 | Collate data by team |
| 618 | Send Message(MSG1) to service component |
| 620 | Receive TotalTeamScore from App N2 |
| 622 | Output result |

| Step | Name: APP_N2 |
|---|---|
| 662 | Receive dataset |
| 664 | Extract teams and scores |
| 668 | Add total scores by team to determine TotalTeamScore |
| 670 | Return TotalTeamScore to sending app |
| | |

FIG. 6

705 — DATASET1: {(Simone, Red team, 20), (Joan, Blue team, 30), (Mary, Red team, 25), (Carlos, Blue team, 25)}

710 — MSG1:{<dataset>, <Team_Total_App dockerfile>, <return address>}

715 — TotalTeamScore{Red team total 45, Blue team total 55}

720 — Red team: Simone 20; Mary 25; Red team total 45
Blue team: Joan 25, Carlos 30; Blue team total 55

722 — DOCKERFILE 1
FROM ubuntu
COPY app_N2_source
RUN app_N2

724 — DOCKERFILE 2
FROM de.icr.io/team 2/App_N2

FIG. 7

IN-BAND INSTANTIATION CONFIGURATION FOR APPLICATION WORKLOADS

BACKGROUND

The invention is generally directed to engines and services. The invention provides a method, computer program product and system suitable for managing an application.

"Serverless" workload engines and services allow code developers to deploy an application, also known as an app, to cloud computing infrastructures easily.

Deploying an application means installing an application into a server context. The steps required will be different depending on the type of server. A "running application" means that it is ready to use. Running of an application means executing the functions provided by the application.

A common approach with serverless services is that a developer provides source code for their application (e.g., into a repository, such as GitHub) or provides a container image for the application. The serverless service, such as IBM Cloud Code Engine (or one of the other equivalent serverless container platform services) deploys the container image and returns a hostname and IP address so that a user can access the app to execute functions. A common scenario is that the developer may want to offload some work functionality from this first app to a second app (or indeed to multiple other apps). For example, if the first app contains a number of only loosely related functions, some could be handled by a separate, second app. For example, a travel company may want to offload the customer booking front-end app, away from the payments backend app. Or the developer may wish for greater concurrency, taking advantage of multi-threading capabilities by having different apps execute different functions of the overall solution, or by being able to scale an app to a greater number of instances when needed. IBM, IBM Cloud® Code Engine (Code Engine) are trademarks of International Business Machines Corporation, registered in many jurisdictions worldwide. The registered trademark Linux® is used pursuant to a sublicense from the Linux Foundation, the exclusive licensee of Linus Torvalds, owner of the mark on a worldwide basis.

In order to refactor the first app so that requests can, for example, be sent to a second app, the IP address of the second app is needed. However, the IP address of the second app can only be discovered once the second app is deployed. Thus, there are multiple actions required before the first and second apps can be put into operation.

Therefore, there is a need in the art to address the aforementioned problem.

SUMMARY

According to the present invention there are provided a method, a system, and a computer program product according to the independent claims.

Viewed from a first aspect, the present invention provides a computer implemented method for managing an application. The method includes defining, by a first application, a specification of a second application and sending, by the first application, a request to a subsystem, wherein the request comprises a file, the file comprising the specification, and request data to be processed. The method further includes configuring, by the subsystem, an instance of the second application, wherein the configuring includes provisioning the instance according to the specification and sending the received request data to the instance. The method further includes processing, by the instance, the request data.

Viewed from a further aspect, the present invention provides a computer program product comprising: a computer readable storage medium readable by one or more processing circuit and storing instructions for execution by one or more processor for performing a method. The method includes defining, by a first application, a specification of a second application and sending, by the first application, a request to a subsystem, wherein the request comprises a file, the file comprising the specification, and request data to be processed. The method further includes configuring, by the subsystem, an instance of the second application, wherein the configuring includes provisioning the instance according to the specification and sending the received request data to the instance. The method further includes processing, by the instance, the request data.

Viewed from a further aspect, the present invention provides a system comprising: a memory; a first application; a subsystem; a second application; at least one processor in communication with memory; and program instructions executable by one or more processors via the memory to perform a method. The method includes defining, by the first application, a specification of the second application and sending, by the first application, a request to the subsystem, wherein the request comprises a file, the file comprising the specification, and request data to be processed. The method further includes configuring, by the subsystem, an instance of the second application, wherein the configuring includes provisioning the instance according to the specification and sending the received request data to the instance. The method further includes processing, by the instance, the request data.

Viewed from a further aspect, the present invention provides a computer program stored on a computer readable medium and loadable into the internal memory of a digital computer, comprising software code portions, when said program is run on a computer, for performing the steps of the invention.

Viewed from a further aspect, the present invention provides a computer implemented method for managing an application, the method comprising: defining, by a first application, a specification of a second application; sending, by the first application, a hypertext protocol ("HTTP") request to a subsystem, wherein the request comprises a file, the file comprising the specification, request data to be processed; and a return address; configuring, by the subsystem, an instance of the second application, the configuring comprising: provisioning the instance according to the specification; and sending the received request data to the instance; processing, by the instance, the request data; receiving, by the subsystem, a reply from the instance; and sending, by the subsystem, the reply to the first application at the return address.

Viewed from a further aspect, the present invention provides a system comprising: a first application for: defining a specification of the second application; and sending an HTTP request to the subsystem, wherein the request comprises a file, the file comprising the specification, request data to be processed; and a return address; an instance of a second application of the system; a subsystem for configuring the instance, the configuring comprising: provisioning the instance according to the specification; sending the received request data to the instance; receiving a reply from the instance; and sending the reply to the first application at the return address; the instance operable for processing the request data.

Preferably, the present invention provides a method, computer program product, and system operable for, comprising: receiving, by the subsystem, a reply from the instance; and sending, by the subsystem, the reply to the first application.

Preferably, the present invention provides a method, computer program product, and system operable for, wherein configuring comprises: in response to an instance of the second application not already provisioned according to the specification, provisioning, by the system, the instance according to the specification; and sending the received request data to the instance; and in response to an instance of the second application already provisioned according to the specification, sending the received request data to the instance.

Preferably, the present invention provides a method, computer program product, and system operable for, wherein the file comprises a container file, the method further comprising building, by the system, the second application according to the specification from the container file.

Preferably, the present invention provides a method, computer program product, and system operable for, further comprising, in response to processing the request data, disposing of, by the subsystem, the instance.

Preferably, the present invention provides a method, computer program product, and system operable for, wherein the request comprises an HTTP request.

Preferably, the present invention provides a method, computer program product, and system operable for, wherein the file further comprises a return address, and wherein sending the reply comprises sending the reply to the first application at the return address.

Preferably, the present invention provides a method, computer program product, and system operable for, wherein the file comprises at least one member of a list, the list comprising an application, an application identifier, an application link, a container file, a container file identifier, and a container file link.

Preferably, the present invention provides a method, computer program product, and system operable for, wherein the subsystem is provided as a service in a cloud environment.

Preferably, the present invention provides a method computer program product and system operable for, wherein the subsystem is a serverless subsystem.

Preferably, the present invention provides a method computer program product and system operable for, wherein sending, by the first application, a request to a subsystem comprises sending the request in-line.

Preferably, the present invention provides a method computer program product and system operable for, wherein the file comprises parameters specifying a first version of the second application to be configured; and configuring comprises configuring an instance of the first version of the second application, by the subsystem, an instance of the second application.

Advantageously, a first (also known as source) application sends messages to a serverless service, the message containing both the data to be processed and a specification of the application to be created to process said data. The first application sends all messages to the serverless service so does not need to know the details of the second (target) application. A listening address that the first app uses could be passed in-line with the messages too, for the second (target) application to return messages or events to. Once the second (target) application has processed the workload request the serverless service can stop the second (target) application, or simply scale it down, removing the application entirely after a specified period of time.

Advantageously, this allows for a more dynamic application creation flow: instead of creating the second (also known as target) app up front, or arranging with another team for this to be done, to be used by a first app, the creation of this second app can be done on demand from a request from the first app. This further would allow the first app to discover any updated parameters or configuration values for the second app, and dynamically specify them when creating the second app (e.g., for given requests it might use v1.0.0 or v2.0.0 of the second app for A/B testing or similar).

BRIEF DESCRIPTION OF THE DRAWINGS

The present invention will now be described, by way of example only, with reference to preferred embodiments, as illustrated in the following figures.

DETAILED DESCRIPTION

A container image is a standalone, executable package of software that includes everything needed to run an application: code, runtime, system tools, system libraries and settings, so the application runs quickly and reliably from one computing environment to another. Container images become containers at runtime. In the context of cloud computing an "application" employed on a cloud is also known as a service, or an instance, whereas "workload" refers to the data processing on an application.

Kubernetes is a common container management system for automating software deployment, scaling, and management. A Kubernetes Master Control Plane comprises an application programming interface ("API") server, which serves the Kubernetes API internally and externally. The API server processes and validates representational state transfer ("REST") requests and updates the state of the API objects in the system. A node is a machine where containers are deployed. Every node in a Kubernetes cluster must run a container runtime, for example, Docker. Containers themselves run in a "pod". A pod is a basic unit comprising at least one container located on the same node. Each pod has a unique IP address within the Kubernetes cluster. A Service is a set of pods that work together. Containers are exposed through external IP addresses.

Kubernetes itself has many complexities and is difficult for non-specialists to manage. Therefore, "serverless" workload engines/services have grown in popularity in recent years and continue to do so. "Serverless" computing is a type of computing wherein the cloud provider fully manages the allocated resources. Although real servers are necessary in the infrastructure, it is so named as "serverless", because to the customer the servers themselves are invisible. Management of the servers is left up to the cloud provider, with the customer just using services provided.

Serverless applications are often deployed in containers. Kubernetes itself cannot run serverless applications (also known as apps) without specialized software that integrates Kubernetes with a specific cloud provider's serverless platform.

IBM Cloud® Code Engine (Code Engine) was developed by IBM with the goal of helping create modern, source-centric, containerized, and serverless apps and jobs. The platform is designed to address the needs of developers who just want their code to run. Code Engine abstracts the operational burden of building, deploying, and managing workloads in Kubernetes so that developers can focus on what matters most to them: the source code. Code Engine is a fully managed, serverless platform. Code Engine manages and secure the underlying infrastructure for customers bringing container images, batch jobs, or source code. Code Engine sizes, deploys, or scales container clusters for the user.

An application is a process that exposes an HTTP endpoint. The application can be used, for example, as a backend for a web or mobile application. An application, or app, runs a developer's code to serve HTTP requests. One example of tooling is Code Engine, which is based on Knative components that build on top of Kubernetes, hiding the complexities so developers can focus on writing code instead of managing the hosting environment. Knative allows any container to run as a serverless workload application on any cloud platform that runs Kubernetes.

With the Serving component of Code Engine, an app is hosted as a Kubernetes pod. In Code Engine an application is deployed as a service. Code Engine sets up networking providing an endpoint that a user can access. As loads change, the number of running instances of an app are automatically scaled up or down based on incoming workloads and based on configuration settings. An app contains one or more revisions. A revision represents an immutable version of the configuration properties of the app. Each update of an app configuration property creates a new revision of the app. Applications are deployed with a name and image, and access via HTTP or hypertext transfer protocol secure ("HTTPS"). Specific versions of an app are accessed via a dedicated uniform resource locator ("URL"). In addition to traditional HTTP requests, Code Engine also supports applications that use WebSockets as their communications protocol.

To deploy an app in Code Engine, first a container image needs to be created that has all of the runtime artifacts that the app needs to run, such as runtime libraries. Many different methods may be used to create the image, including building the app from source code by using the build container images feature available in Code Engine. The image can be downloaded from either a public or private image registry.

A build, or image build, is a mechanism that can be used to create a container image from the source code. One popular container technology is Docker. Code Engine supports building from a "Dockerfile" and Cloud Native Buildpacks. A Dockerfile is a text configuration file written using a special syntax. A Dockerfile describes step-by-step instructions of all the commands needed to build a Docker Image. The Docker build command processes this file generating a Docker Image in an image cache. The docker image can then be run.

The most common use case of serverless today is supporting microservices architectures. The microservices model is focused on creating small services that do a single job and communicate with one another using APIs. While microservices can also be built and operated using either PaaS or containers, serverless has gained significant momentum given its attributes around small, discrete bits of code, inherent and automatic scaling, rapid provisioning, and a pricing model that never charges for idle capacity. Although the examples used to explain the invention are typically considered as microservices, the invention is equally applicable to other application architecture use-cases.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
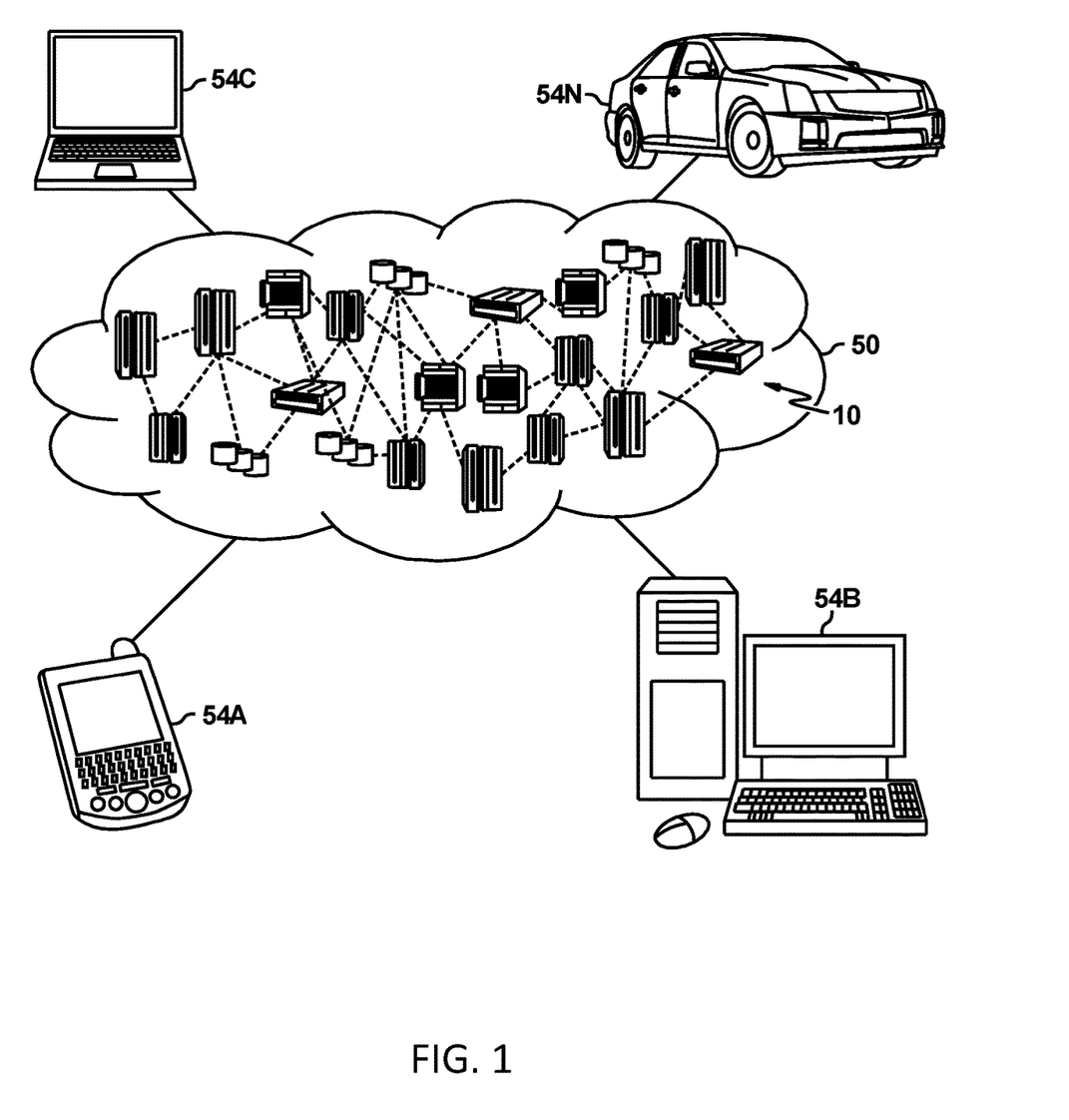
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
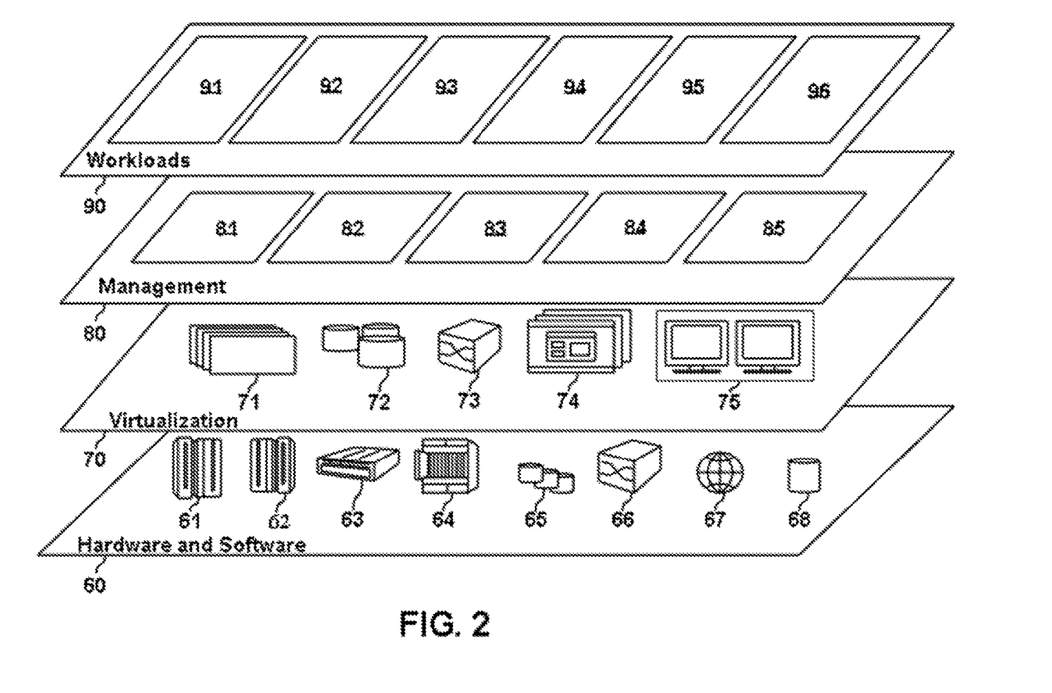
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Resource provisioning 81 may comprise a service component 501 of the invention. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. Other examples of workloads (not depicted in FIG. 2) are those on apps 610, 660 used to illustrate the invention.

To illustrate the invention, a simple scenario 'Team Scores' will be considered. In this exemplary scenario, individuals are competing as part of teams in a sports competition. The individuals get scores based on their performances and these are later added together to get a team total score.

Pseudo code snippets will used to illustrate the examples.

Turning first to prior art methods, a first app App1 is used to receive a dataset comprising a set of records comprising {<name>, <team>, <score>}. A second app, App_2 is used by first app App1 to perform some of the workload. first app App1 sends at <scores> for each <team> to second app App2 to calculate an aggregate score for each team.

App1 is an application that receives data in the form of {<name>, <team>, <score>}, collates the data into teams, and calculates each team's total score.

An input dataset is provided to App1:

```
{(Simone, Red team, 20), (Joan, Blue team, 25), (Carlos, Blue team, 30), (Mary, Red team, 25)}
App1 (pseudo code)
Receive dataset
Extract names, teams and scores
Collate data by team
Add the total score by team
Output for each team: names/scores and team total
```

Deploying app App_1 returns a host name (DNS)+url/IP address eg http://abc1.abc.com/app1

App1 can now be executed at that host name and IP address, for example using a curl command, with the dataset.

cURL, which stands for 'client URL', is a command line tool for developers to use to transfer data to and from a server. At the most fundamental, cURL allows developers communicate with a server by specifying the location (in the form of a URL) and the data you want to send.

App App_1 executes and produces the following output:

```
Red team: Simone 20; Mary 25; Red team total 45
Blue team: Joan 25, Carlos 30; Blue team total 55
```

Now consider that the developer of app App_1 wishes to offload the team score calculation to another app App_2. App App_2 could already exist in an application repository (eg GitHub), or may have to be written afresh by a developer. Once deployed, app App_2 receives the database, extracts the names, adds up the total by team, and returns the team totals. Currently, the way to do this is create a second app App_2, note the returned hostname and IP address, and then reconfigure the original app App_1 to create new version app App_1', specifying the host name and IP address of the destination app App_2 that it is to send workload to (communicated via messages). This adds complexity to the process of deploying apps. App App_2 is also known as a 'target' app App_2 to 'source' app App_1.

```
App_2
Receive dataset
Extract teams and scores
Add total score by team
    Return team scores list to sending app
```

Deploying app App_2 returns a host name (DNS)+url/IP address e.g., http://abc2.abc.com/app2

To pass the dataset to app App_2, app App_1 needs to be updated to produce app App_1' with the IP address of the deployed app App_2 (i.e., http://abc2.abc.com/app2).

```
App_1'
Receive dataset
Extract names, teams and scores
Collate data by team
Send {dataset} to App_2 at url http://abc2.abc.com/app2
Wait to receive list from App_2
Output for each team: names/scores and team total
```

App1 can now be executed with that host name and IP address, for example using a curl command. App App_1 executes, sending message to app App_2. App App_2 executes, and returns {Red team total 45, Blue team total 55} to app App_1. App App_1 incorporates the returned dataset to again produce the following output:

```
Red team: Simone 20; Mary 25; Red team total 45
Blue team: Joan 25, Carlos 30; Blue team total 55
```

Turning now to the present invention, the present invention makes it possible for the source app to be able to send messages to a yet-to-be-created second app by passing the specification of the app being requested inline into the queue of workload messages sent to Code Engine. This cuts out an additional step of reconfiguring the source app and means that the source app does not need to have knowledge of the specific hostname and IP address of the destination app, which may not even exist at this point, because the container service (e.g., Code Engine) itself handles the process. The first (source) app sends all messages to the serverless service so does not need to know the details of the second (target) app. A listening address that the first (source) app uses is another parameter that can be passed in-line with the messages too, for the second (target) application to return messages or events to. Once the second (target) application has processed the workload request the serverless service can stop the second (target) application, or simply scale it down to zero, removing the application entirely after a period of time.

Consider now an example according to an embodiment of the present invention. The scenario of 'Team Scores' will again be used. To illustrate the present invention, an example application App_N1 is managed in a managed Kubernetes cloud. The skilled person will appreciate that the present invention is equally applicable with other applications, with other cloud technologies, and also in other non-cloud computer systems. In a preferred embodiment, the Code Engine provides serverless capabilities. This invention would be equally applicable to other modern workload services, of which there are several. Examples of other workload serverless systems include Microsoft (Azure), Amazon (AWS), and Oracle cloud. Microsoft, and Azure are trademarks of Microsoft Corporation in the United States, other countries, or both. Amazon AWS is a trademark of Amazon.com, Inc. or its affiliates in the United States and/or other countries. Oracle Cloud is a trademark or registered trademark of Oracle and/or its affiliates.

Figure 3:
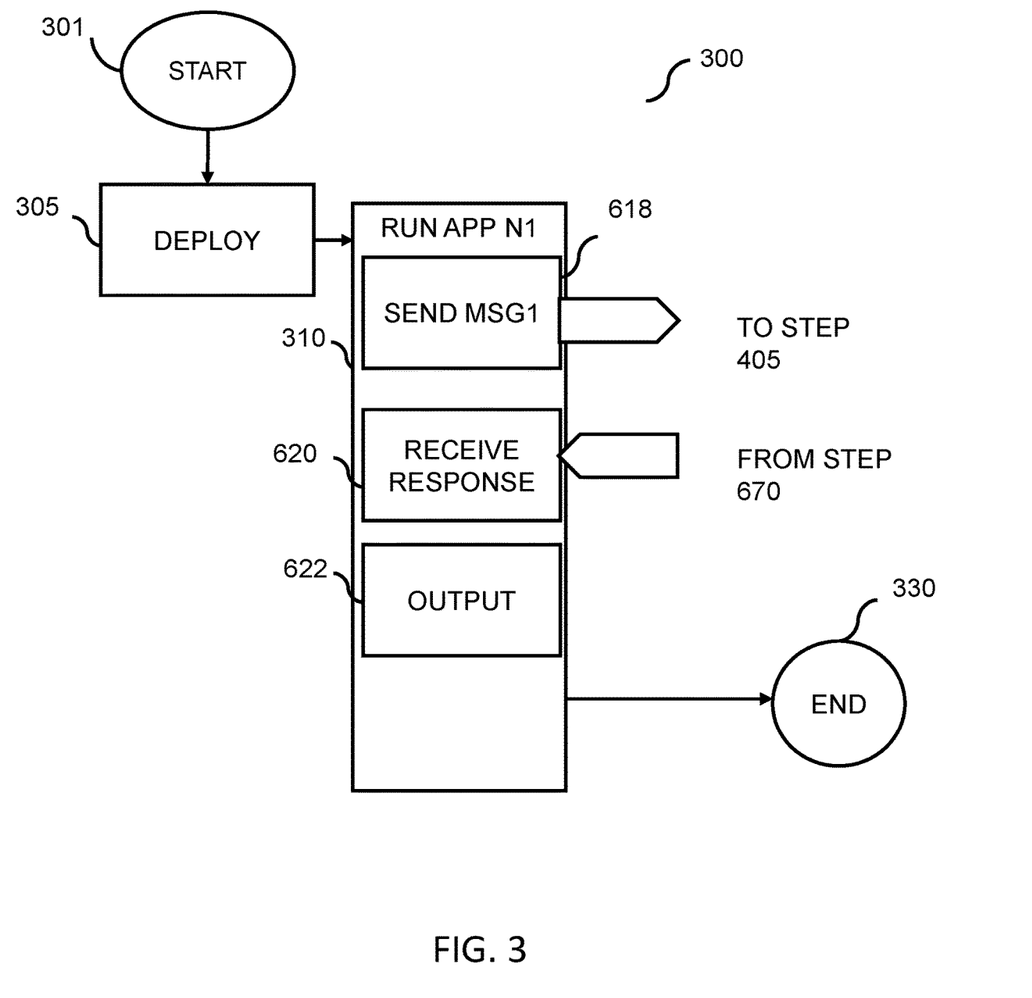
FIG. 3 depicts operation methods steps for processing an app, in accordance with a preferred embodiment of the present invention.
Figure 4:
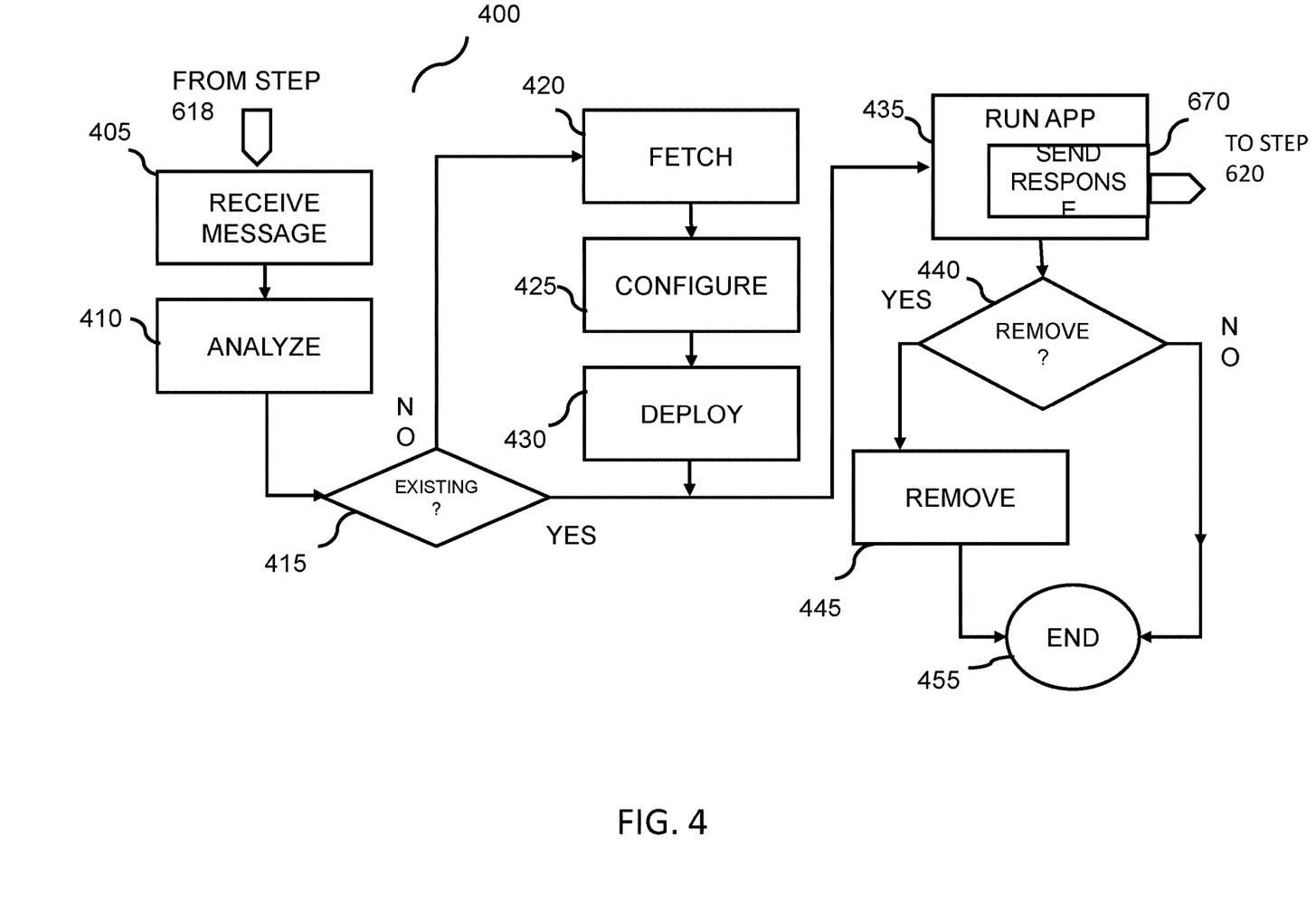
FIG. 4 depicts further operation method steps performed by a service component within a system, in accordance with a preferred embodiment of the present invention.
Figure 5:
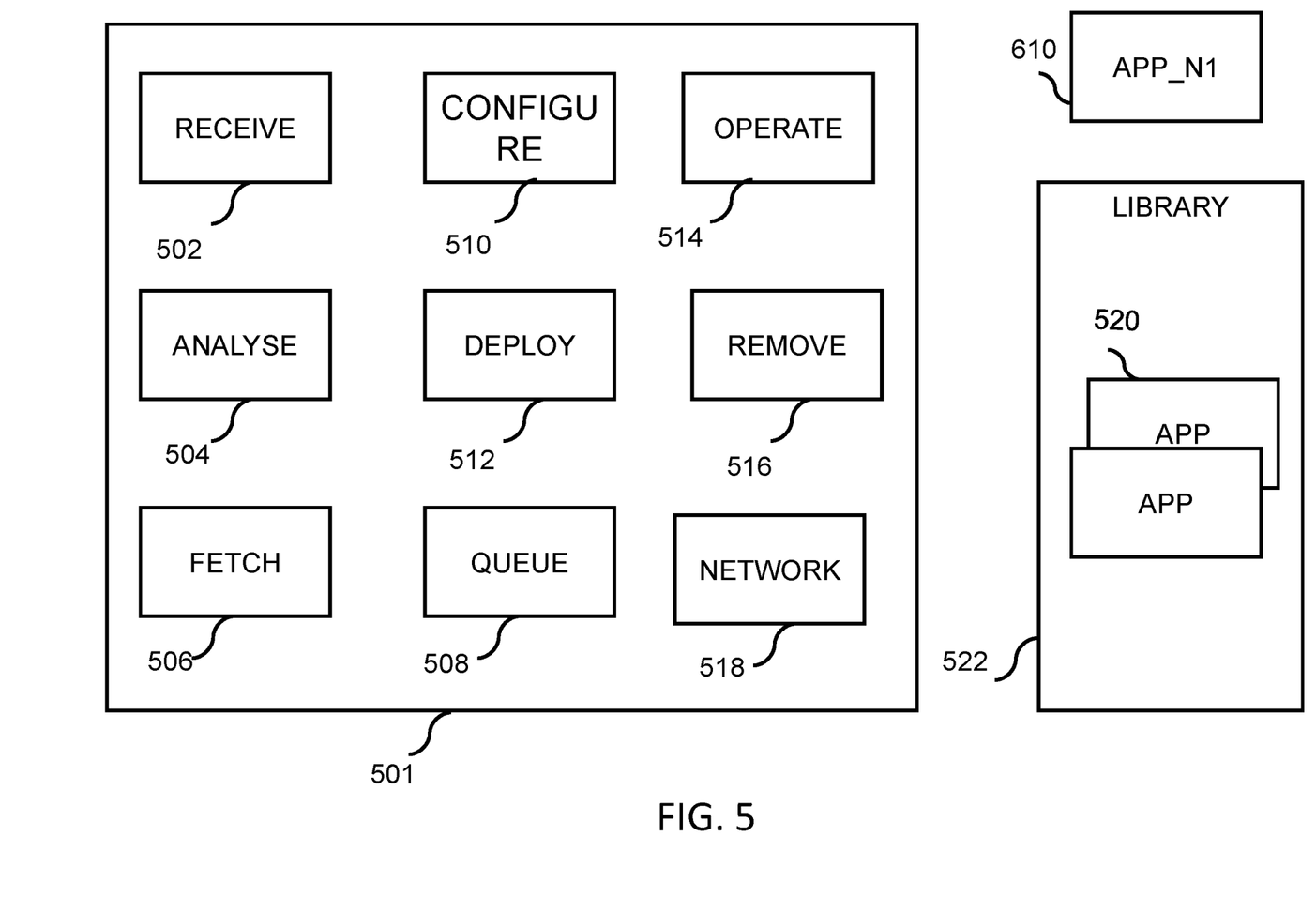
FIG. 5 depicts a software component 500 associated with managing the computer environment in accordance with a preferred embodiment of the present invention.

FIG. 3, which should be read in conjunction with FIGS. 4 to 7, is a high-level exemplary schematic flow diagram 300 depicting operation methods steps for processing an app, using App_N1 as an example, in accordance with a preferred embodiment of the present invention. FIG. 4 is a further high-level exemplary schematic flow diagram 400 depicting further operation method steps performed by a service component 501 within a system 500, in accordance with a preferred embodiment of the present invention. FIG. 5 depicts a software component 500 associated with managing the computer environment 50 to be used in method steps of FIG. 3 and FIG. 4, in accordance with a preferred embodiment of the present invention. The software component 500 comprises a service component 501, an App_N1 610, a library 508. The library comprises a code repository, such as but not restricted to GitHub. The code repository contains a set of apps 520.

Figure 6:
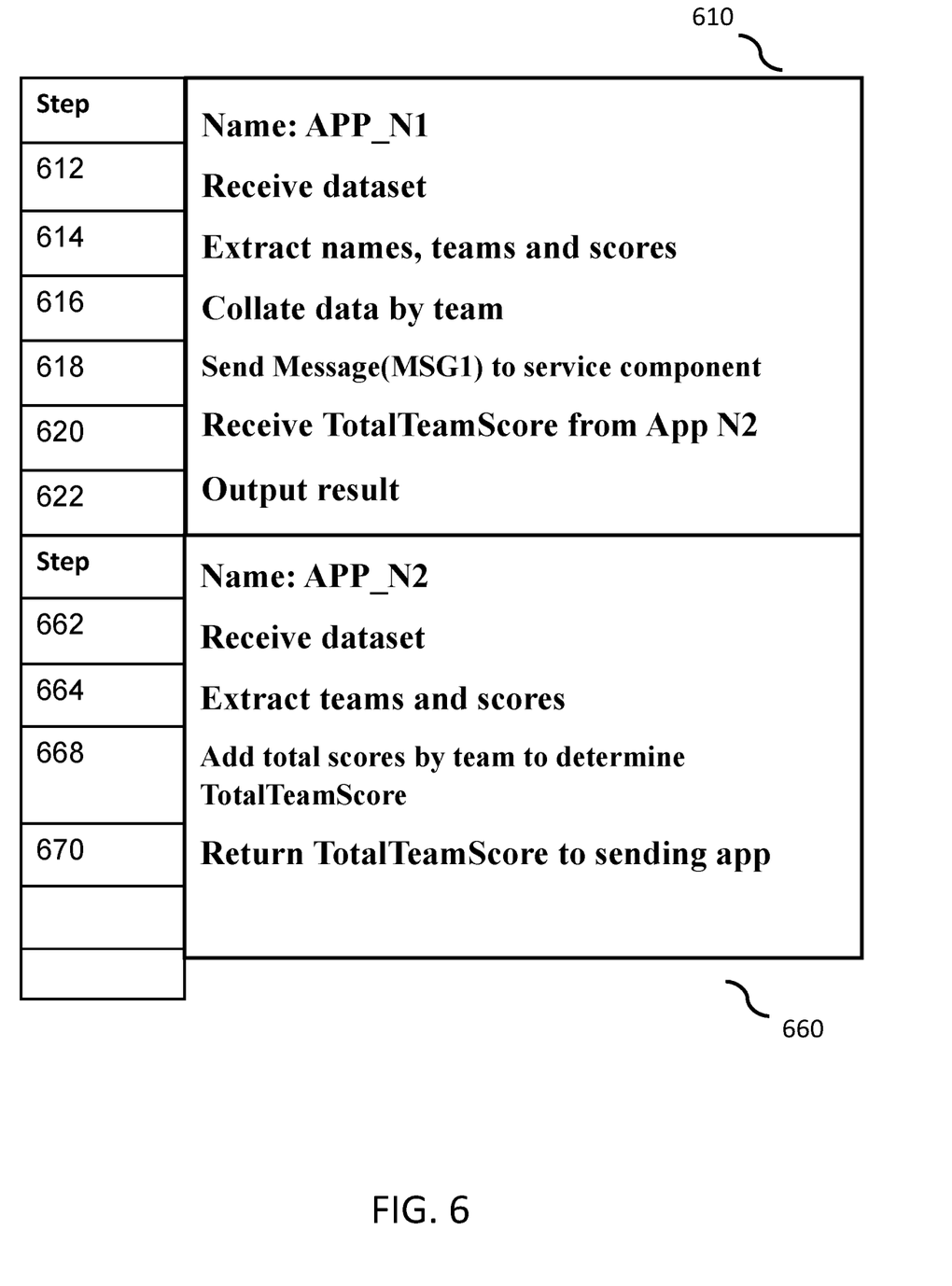
FIG. 6 depicts apps used as example applications, in accordance with a preferred embodiment of the present invention.
Figure 7:
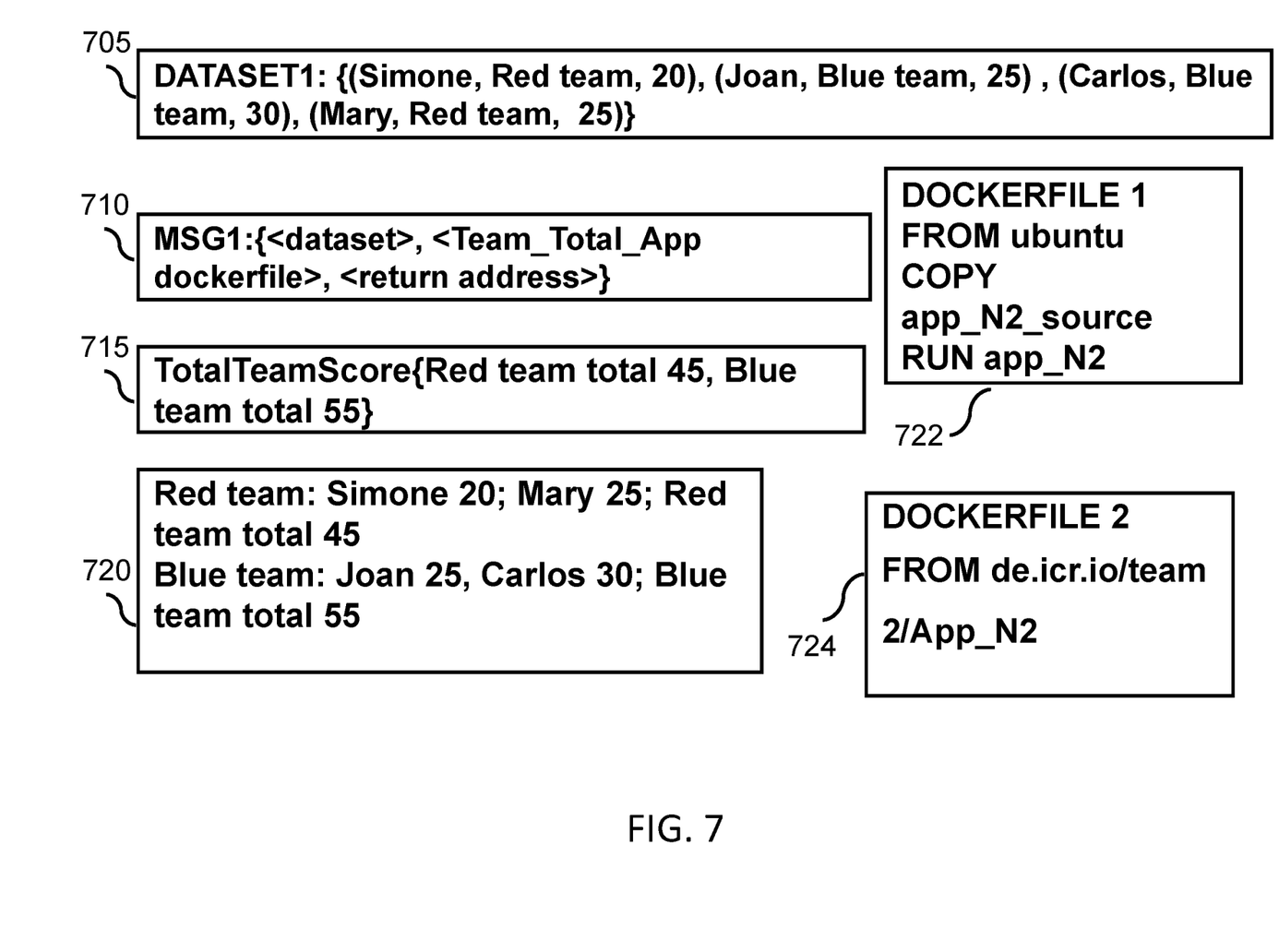
FIG. 7 depicts code elements, in accordance with a preferred embodiment of the present invention.

FIG. 6 depicts two apps App_N1 610, and App_N2 660, used as example applications, in accordance with a preferred embodiment of the present invention. FIG. 7 depicts a dataset 705, a message MSG1 710, a result TotalTeamScore 715, and an output result 720, used to illustrate a preferred embodiment of the present invention. App_N1 610 comprises, or has access to, a Dockerfile1 722 and/or Dockerfile 2 724 that defines the second app App_N2 660.

The method 300 starts at step 301. At step 305, App_N1 610 is deployed by Code Engine to the computing environment 50. At step 310 App_N1 610 is executed. Within App_N1 610, at step 612 a dataset 702 is received from a user (not depicted). At step 614, names, teams and scores (Simone, Red team, 20), (Joan, Blue team, 25), (Carlos, Blue team, 30), (Mary, Red team, 25) are extracted from the dataset. At step 616, runtime engine that operates app App_N1 610 collates the extracted data to produce a collated list, in this example:

Red team: Simone 20; Mary 25; Blue team: Joan 25, Carlos 30.

At step 618, a message MSG1 710 is sent 618 to a queue 508 of the service component 501 of CE. The message MSG1 710 is in the form of an HTTP request to the service component 501 in Code Engine. For example, in an HTTP header: "CE-App-Def" http header that has, in essence, "ibmcloud ce application create <parameters>.

The message 710 comprises: the dataset 705; the Dockerfile 722, 724; a return address of App_N1 610 that return messages can be sent to, and parameters. The Dockerfile 722, 724 also comprises parameters. Examples of parameters of the message and/or Dockerfile 722, 724 comprise: any environment variables specific to this request; whether the second (target) app should be disposed of immediately or retained for a set timeout (e.g., "scale to zero" if no further requests for the second (target) app are received within 5 minutes; and how the response should be returned. The response could, for example, be one of the following: i) synchronously in the HTTP response; ii) synchronously by opening a persistent web-socket that can then be used for further requests from first (source) app to second (target) app (via CE); iii) asynchronously to a specified public IP and port (i.e. a callback to the first (source) app).

In an alternative embodiment the message 710 comprises a link to the Dockerfile 722, 724 that can be accessed by the service component 501, rather than the Dockerfile 722, 724.

The sending 618 of the message MSG1 710 is in-band, because all information to set up the new second (target) app App_N2 660 in a serverless manner, with configuration parameters, is in one message stream (e.g., this could just be in the HTTP message header). Configuration does not have to transmitted separately.

Control is passed to step 405. Although the method steps performed by App_N1 and the service component 501 are described as being run serially, the skilled person would understand that App_N1 and the service component 501 may execute in parallel. The in-band aspect comprises sending all information to set up a new second (target) application in a serverless manner, with configuration parameters, in one message stream (e.g., this could just be in the HTTP message header), in contrast with having to define configuration separately.

In an alternative embodiment a subset of the dataset 705 is embedded in message MSG1 710, for example, comprising any data that is necessary for app App_N2 660. In an alternative embodiment as different dataset 705 is embedded in message MSG1 710, for example, comprising any data that is necessary for app App_N2 660.

The service component 501 is serverless. Then service component 510 transparently manages the deployment (also known as provisioning), calling of, and disposal of an app App_N2 660 at the request of another app App_N1 610.

At step 405, a receive component 502 of the service component 501 receives 405 the message MSG1 710 from the queue 508 of the service component 501. At step 410 an analyse component 504 of the service component 501 analyses 410 the message MSG1 710 to identify the elements of the message MSG1 710. The elements of the message MSG1 710 comprise the dataset 705 or a subset of the dataset 705, the Dockerfile 722, 724; the return address of App_N1 610 that return messages are sent to; and parameters. At step 415, the analyse component 504 determines whether the app App_N2 660 is already deployed according to parameters passed in the message MSG1 710.

If the app App_N2 660 is not (NO) already deployed according to parameters passed in the message MSG1 710, control passes to a fetch component 506 of the service component 501. The fetch component 506 fetches 420 an application App_N2 660 that is stored in a system library 522 of the system. At step 425, a configure component 510 of the service component 501 configures 425 the fetched app App_N2 660 according to parameters passed with the message MSG1 710. These parameters may be directly identified within the message or may be identified in the Dockerfile 722, 724 passed.

An example of a Dockerfile1 722 is:

---
Dockerfile1:
FROM ubuntu
COPY App_N2_source
RUN App_N2

---

With this example of the Dockerfile 722, the fetch component 506 fetches 'App_N2_source" source code from the current directory. The configure component 510 of the service component 501 configures 425 the fetched app App_N2 by creating a corresponding Docker image from the Dockerfile1 722. The configure component 510 builds a Docker image comprising Linux® Ubuntu along with app App_N2 660 and runs app App_N2 660.

Another example of a Dockerfile is Dockerfile2:

---
Dockerfile2:
FROM de.icr.io/team2/App_N2

---

With this example of the Dockerfile 724, the fetch component 506 fetches 'App_N2' image from a directory at de.icr.io/team2 The app App_N2 660 already functions in the right way and is already built and packaged.

In an alternative embodiment, the fetch component 506 resolves the Dockerfile 722, 724 link to identify the Dockerfile 722, 724, which is used to fetch 420 the application App_N2 660.

At step 430, a deploy component 512 deploys 430 the fetched app App_N2 660 according to the passed parameters embedded with the message MSG1 710. Control passes to step 435. Although the configure step 425 and deploy step 440 are depicted as separate steps, the skilled person would understand that a single step could be used that configures 425 and deploys 430 an app.

If the app App_N2 660 is (YES) already deployed as specified in the parameters passed in the message MSG1 710, control also passes to step 435. Network services, for example, setting up of IP address routing between apps in the system are handled by a network component 518.

At step 435, the service component 501 sends the dataset Dataset1 705 to the deployed app App_N2 660. An operate component 514 of the service component 501 triggers operation of app App_N2 running on its assigned pod (not depicted). At step 662, as depicted in FIG. 6, the dataset 705 is received by app App_N2 660. At step 664, teams and scores are extracted. At step 668, a total score for each team is calculated to determine the TotalTeamScore 715 for each team. At step 670 TotalTeamScore 715 is returned to the calling app App_N1 610 through the network component 518. The service component 701 knows an address where to send TotalTeamScore 715, because message MSG1 710 comprises a return address.

At step 440, the service component 501 determines whether app App_N2 660 should be removed from the pod where it had been deployed to previously, according to the parameters passed in the message MSG1 710. If app App_N2 660 should be removed (YES), at step 445 a remove component 516 removes 445 app App_N2. At step 455 method 400 ends. Alternatively, if at step 440 the app App_N2 660 should not be removed (NO), at step 455 method 400 ends.

Returning to the method of FIG. 3, at step 620, TotalTeamScore 715 is received from app App_N2 660. At step 622 the result 720 is output.

---
Red team: Simone 20; Mary 25; Red team total 45
Blue team: Joan 25, Carlos 30; Blue team total 55

---

At step 330 the method of FIG. 3 ends.

In an alternative embodiment, although the service component 501 determines that an instance of app App_N2 660 is also available to use, app App_N1 610 request that its own instance of app App_N2 is configured, deployed, and used.

In an alternative embodiment (not depicted), a first app App_N3 comprises a spreadsheet application running on a first processor of a multi-processor server. The spreadsheet application comprises a set of columns {A, B, . . . }, and a set of rows {1, 2, . . . } to define a set of cells {A1, B1 . . . , A2, B2, . . . }. Cells {C1, C2, C3, . . . Cx} are populated by numbers {$n_1$, $n_2$, $n_3$ . . . $n_x$}, respectively. Cell D2 comprises a spreadsheet macro, which functions to calculate a weighted average of cells {C1, C2, C3, . . . Cx}, based on a weight value in cell D1.

Macro_1: $\text{Value\_D2} = \text{Value\_D1} * \text{Average}\{C1, \ldots Cx\}$ App App_N3 offloads calculation Macro_1 to a further app App_N4 to be run on second processor of the multi-processor server using a service component 501. App App_N3 is unaware of resource utilization on or the routing information to the other processors on the server. In this alternative embodiment, the message MSG2 comprises a dataset Dataset2, a name of app App_N4, a return address for App_N3, and parameters indicating to the service component 501 that app App_N4 is to be run on the least resource utilized of the other processors on the server.

---
DATASET2: {$\Sigma_1$*Value_x}
MSG2: {DATASET2, <App_N4>, <App_N3_return_address>, parameter_1}
where:
App_N4 operates to provide result of Macro_1 calculation;
parameter_1 signifies App_N4 to run on least resource utilized processor, and that App_N4 is not removed after use if App_N3 active.

---

On a user first entering values into cells {C1, C2, C3, . . . Cx}, calculation of the contents of cell D2 is passed to the service component 501. The service component 501 configures 425 app App_N4 on the least utilized processor. At step 435 app App_N4 operates to calculate the contents of cell D2. The calculated content is passed back to app App_N3, with cell D2 populated by the calculated value. On the user subsequently entering new values into cells {C1, C2, C3, . . . Cx}, calculation of the contents of cell D2 is passed to the service component 501. As app App_N4 is already deployed, at step 435 app App_N4 operates to calculate the contents of cell D2. Again, the calculated content is passed back to app App_N3, with cell D2 populated by the calculated value. On app App_N3 exiting operation, a further message MSG4 is sent to the service component with a null dataset, and parameters signifying to the service component 501 to remove app App_N4. At step 330 and step 455 the methods end.

In an alternative embodiment (not depicted), a first app App_N5 comprises a form processing application running on a first server of a multi-server system. The form processing application App_N5 allows a new subscriber to be added to a distribution list for a sports club. The form processing application comprises an email field Field_1 and an Submit button.

On a user providing and submitting an email entry, app App_N5 offloads handling of the email entry to a second app App_N6. The function of app App_N6 is to check for entry validity, addition of valid email entry into the distribution list, emailing of a welcome email to the new subscriber, and emailing the membership secretary of the new member.

App App_N6 is to be run on any other server of the multi-server system. In this alternative embodiment, message MSG3 comprises a dataset Dataset3, an identification of app App_N6, <App_N6_id>, a return address for App_N5, and parameters indicating to the service component 501 that app App_N6 is to be run on any other server, and that app App_N6 is to be removed after use, because membership additions only occur weekly.

---

DATASET3 = {contents of email field}
MSG3: {DATASET3, <App_N6_id>, <App_N5_return_address>, parameter_2}
where:
parameter_2 signifies App_No to run on any other server, and App_N6 to be removed after operation

---

In an alternative embodiment the message MSG1 710, MSG2, MSG3 comprises a specification of how to create the second app App_N2 660, App_N4, App_N6. The skilled person would understand that other variations could be created where the specification of the second app App_N2 660, App_N4, App_N6 is passed to the service component 501 along with dataset Dataset1 705, Dataset2, Dataset3 in the message MSG1 710, MSG2, MSG3.

On a subscriber entering an email address, and submitting, the contents of the email field Field_1 is passed to the service component 501. The service component 501 configures 425 app App_N6 on another server. At step 435 app App_N6 checks for entry validity, if valid adds the email entry into the distribution list, emails the new subscriber with a welcome pack, and emails the membership secretary of the new member. A message is also sent back to the app App_N5 to display a success message in the form. At step 445 the service component 501 removes app App_N6. At step 330 and step 455 the methods end.

In an alternative embodiment, the second app App_N2 660, App_N4, App_N6 does not need to send back any response to the first app App_N1 610, App_N3, App_N5, so no return address needs to be provided in the message MSG1 710, MSG2, MSG3.

In an alternative embodiment, the first app App_N1 610, App_N3, App_N5 specifies in the message MSG1 710, MSG2, MSG3 that updated parameters or configuration values for the second app App_N2 660, App_N4, App_N6, are to be used. This allows for dynamic specification when creating the second app App_N2 660, App_N4, App_N6. For example, for given requests version v1.0.0 or v2.0.0 of the second app App_N2 660, App_N4, App_N6 are used for testing purposes.

In an alternative embodiment, the first app App_N1 610, App_N3, App_N5 sets a time interval for the service component 501 to retain the resources of second app App_N2 660, App_N4, App_N6. In an alternative embodiment, the service component 501 determines the time interval for retention of the resources of the second app App_N2 660, App_N4, App_N6, because, for example, the service component 501 may get requests for the second app App_N2 660, App_N4, App_N6 from multiple sources, so can make a better determination about how long to keep idle instances of the second app App_N2 660, App_N4, App_N6 for.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For the avoidance of doubt, the term "comprising", as used herein throughout the description and claims is not to be construed as meaning "consisting only of".

What is claimed is:

1. A computer-implemented method for managing an application, the method comprising:
    defining, by a first application, a specification of a second application;
    sending, by the first application, a request to a subsystem, wherein the request comprises a file, the file comprising the specification and request data to be processed;
    receiving, by the first application, a configuration from the subsystem comprising an instance of the second application, the configuration determined by:
        provisioning, dynamically, the instance and a processing environment needed to handle the instance, according to the specification; and
        sending the request data to the instance in a serverless manner, with one or more configuration parameters, in one message stream; and
    processing, by the instance, the request data, wherein the second application and the provisioning execute in parallel.

2. The computer-implemented method of claim 1, further comprising:
    sending, to the subsystem, a reply from the instance; and
    receiving, from the subsystem, the reply from the instance to the first application.

3. The computer-implemented method of claim 1, wherein configuring comprises:
    in response to an instance of the second application not already provisioned according to the specification, provisioning the instance according to the specification; and sending the request data to the instance; and
    in response to an instance of the second application already provisioned according to the specification, sending the request data to the instance.

4. The computer-implemented method of claim 1, wherein the file comprises a container file, the method further comprising building the second application according to the specification from the container file.

5. The computer-implemented method of claim 1, further comprising, in response to processing the request data, disposing of the instance.

6. The computer-implemented method of claim 1, wherein the request comprises a hypertext transfer protocol ("HTTP") request.

7. The computer-implemented method of claim 2, wherein the file further comprises a return address, and wherein sending the reply comprises sending the reply to the first application at the return address.

8. The computer-implemented method of claim 1, wherein the file comprises at least one member of a list, the list comprising an application, an application identifier, an application link, a container file, a container file identifier, and a container file link.

9. The computer-implemented method of claim 1, wherein the subsystem is provided as a service in a cloud environment.

10. The computer-implemented method of claim 1, wherein the subsystem is a serverless subsystem.

11. The computer-implemented method of claim 1, wherein sending, by the first application, a request to a subsystem comprises sending the request in-line.

12. The computer-implemented method of claim 1, wherein the file comprises parameters specifying a first version of the second application to be configured; and configuring comprises configuring an instance of the first version of the second application, by the subsystem, an instance of the second application.

13. A computer-implemented method for managing an application, the method comprising:
    defining, by a first application, a specification of a second application;
    sending, by the first application, a hypertext transfer protocol ("HTTP") request to a subsystem, wherein the request comprises a file, the file comprising the specification, request data to be processed, and a return address;
    receiving, by the first application, a configuration from the subsystem comprising an instance of the second application, the configuration determined by:
        provisioning, dynamically, the instance and a processing environment needed to handle the instance, according to the specification; and
        sending the request data to the instance in a serverless manner, with one or more configuration parameters, in one message stream;
    processing, by the instance, the request data, wherein the second application and the provisioning execute in parallel;
    sending, to the subsystem, a reply from the instance; and
    receiving, from the subsystem, the reply from the instance to the first application at the return address.

14. A computer program product comprising:
    a computer readable storage medium readable by one or more processing circuit and storing instructions for execution by one or more processor for performing a method comprising:
    defining, by a first application, a specification of a second application;
    sending, by the first application, a request to a subsystem, wherein the request comprises a file, the file comprising the specification, and request data to be processed;
    receiving, by the first application, a configuration from the subsystem comprising an instance of the second application, the configuration determined by:
    provisioning, dynamically, the instance and processing environment needed to handle the instance, according to the specification; and
    sending the request data to the instance in a serverless manner, with one or more configuration parameters, in one message stream; and
    processing, by the instance, the request data, wherein the second application and the provisioning execute in parallel.

15. The computer program product of claim 14, further comprising:
    sending, to the subsystem, a reply from the instance; and
    receiving, from the subsystem, the reply from the instance to the first application.

16. The computer program product of claim 14, wherein configuring comprises:
    in response to an instance of the second application not already provisioned according to the specification, provisioning the instance according to the specification; and sending the request data to the instance;
    and
    in response to an instance of the second application already provisioned according to the specification, sending the request data to the instance.

17. The computer program product of claim 14, wherein the file comprises a container file, the method further comprising building the second application according to the specification from the container file.

18. The computer program product of claim 14, further comprising, in response to processing the request data, disposing of the instance.

19. The computer program product of claim 14, wherein the request comprises a hypertext transfer protocol ("HTTP") request.

20. The computer program product of claim 15, wherein the file further comprises a return address, and wherein sending the reply comprises sending the reply to the first application at the return address.

21. The computer program product of claim 14 wherein the file comprises at least one member of a list, the list comprising an application, an application identifier, an application link, a container file, a container file identifier, and a container file link.

22. The computer program product of claim 14, wherein the subsystem is provided as a service in a cloud environment.

23. The computer program product of claim 14, wherein the subsystem is a serverless subsystem.

24. A system comprising:
    a memory;
    a first application; a subsystem; a second application;
    at least one processor in communication with memory; and
    program instructions executable by one or more processors via the memory to perform a method comprising:
    defining, by the first application, a specification of the second application;
    sending, by the first application, a request to the subsystem, wherein the request comprises a file, the file comprising the specification, and request data to be processed;
    receiving, by the first application, a configuration from the subsystem comprising an instance of the second application, the configuration determined by:
    provisioning, dynamically, the instance and a processing environment needed to handle the instance, according to the specification; and
    sending the request data to the instance in a serverless manner, with one or more configuration parameters, in one message stream; and
    processing, by the instance, the request data, wherein the second application and the provisioning execute in parallel.

* * * * *